United States Patent [19]

Sargisson et al.

[11] 4,240,252
[45] Dec. 23, 1980

[54] ACOUSTICALLY-TREATED MIXER FOR A MIXED FLOW GAS TURBINE ENGINE

[75] Inventors: Donald F. Sargisson; Vivian G. Harris, both of Cincinnati, Ohio

[73] Assignee: General Electric Company, Lynn, Mass.

[21] Appl. No.: 870,709

[22] Filed: Jan. 19, 1978

Related U.S. Application Data

[63] Continuation of Ser. No. 646,325, Jan. 2, 1976, abandoned.

[51] Int. Cl.² .................... F02K 3/04; F02K 1/26; B64D 33/06
[52] U.S. Cl. .................................... 60/262; 181/220; 181/222
[58] Field of Search ............... 181/220, 222; 60/262, 60/261; 239/127.3, 265.17

[56] References Cited

U.S. PATENT DOCUMENTS

| | | | |
|---|---|---|---|
| 3,048,376 | 8/1962 | Howald et al. | 60/262 |
| 3,163,982 | 1/1965 | Rice | 60/262 |
| 3,174,581 | 3/1965 | Duthion et al. | 181/220 |
| 3,227,240 | 1/1966 | Lee et al. | 181/220 |
| 3,477,231 | 11/1969 | Paulson | 181/220 |
| 3,481,427 | 12/1969 | Dobbs et al. | 181/220 |
| 3,568,794 | 3/1971 | Hilbig | 239/127.3 |
| 3,647,021 | 3/1972 | Millman et al. | 181/220 |
| 3,721,389 | 3/1973 | MacKinnon et al. | 239/265.19 |
| 3,820,628 | 6/1974 | Hanson | 181/220 |
| 3,861,140 | 1/1975 | Krabacher | 60/262 |

*Primary Examiner*—Douglas Hart
*Attorney, Agent, or Firm*—Henry J. Policinski; Derek P. Lawrence

[57] ABSTRACT

In a mixed flow gas turbine engine of the type which includes an outer nacelle spaced apart from a core engine to define an annular bypass duct therebetween, there is provided a convoluted lobed mixer having a plurality of cold chutes in flow communication with the bypass duct and hot chutes in flow communication with the core engine. In order to suppress engine turbomachinery and exhaust noise, the mixer is alternatively provided with various combinations of acoustically treated lobes, spool pieces, radial splitters, and/or circumferential splitters. These acoustic treatments act in conjunction with an acoustically treated nozzle assembly and an acoustically treated plug assembly to provide an effective low aerodynamic pressure loss noise suppression system.

6 Claims, 7 Drawing Figures

ACOUSTICALLY-TREATED MIXER FOR A MIXED FLOW GAS TURBINE ENGINE

This is a continuation of application Ser. No. 646,325, filed Jan. 2, 1976, now abandoned.

CROSS-REFERENCE TO RELATED APPLICATIONS

This application is being filed concurrently with U.S. application Ser. No. 646,326 filed Jan. 2, 1976, now abandoned, assigned to the assignee of this invention which discloses and claims a generic invention of which the invention disclosed and claimed herein is a species thereof.

BACKGROUND OF THE INVENTION

The present invention relates to improvements in gas turbine engines and nacelles therefor and, more particularly, to a novel gas turbofan engine which exhibits lower noise levels, improved fuel consumption, greater reliability, easier maintainability, easier replaceability, and improved thrust reversal over prior art gas turbofan engines.

Considerable attention has been devoted to developing a gas turbine engine which is quiet, clean, and economical to operate. Significant improvement has been made in fuel consumption and noise levels of gas turbine engines over the past decade. Accordingly, a new family of high bypass, mixed flow turbofans has recently been introduced into service. These engines have demonstrated noise levels and fuel consumption characteristics far superior to prior art gas turbine engines. The reduced noise levels of such high bypass turbofan engines is attributable to the reduced exit velocities of airflow pressurized by the fans. Though far more quiet than prior art gas turbofan engines, the recently introduced high bypass turbofan engines have higher noise levels than are desired. Therefore, Government regulatory agencies are applying ever more stringent requirements on newly certificated commercial aircraft.

It is, therefore, a primary object of the present invention to provide an economical, easily maintained mixed flow gas turbofan engine with improved noise levels.

SUMMARY OF THE INVENTION

This and other objects are achieved in the preferred embodiment of this invention in which a gas turbofan engine is provided with an outer nacelle which forms both the engine inlet and exhaust. The nacelle is spaced apart from a core engine to define an annular bypass duct therebetween. The incoming air stream is pressurized by a fan disposed in the inlet and thereafter divided between the core engine and bypass duct. A low pressure turbine is provided downstream of the core engine to supply rotational energy to the fan. A convoluted, lobed mixer, having a plurality of circumferentially spaced and alternating cold chutes in flow communication with the bypass duct, and hot chutes in flow communication with the core engine, is provided downstream of the low pressure turbine to intermix the core engine and bypass duct exhaust streams. The mixed stream is thereafter discharged from a fixed area nozzle formed integral with the outer nacelle.

It has been demonstrated that the propulsive force provided by the discharge of the intermixed streams is significantly greater than is obtainable by exhausting each stream through a separate nozzle system. This phenomenon is a direct result of the more efficient utilization of the thermal energy of the core exhaust stream. In separated flow engines, much of the thermal energy of the core exhaust stream is lost when it is directly discharged into the ambient atmosphere. However, the engine of the present invention, by intermixing the core engine and bypass streams so as to increase the temperature of the bypass stream, while decreasing the temperature of the core stream, permits the thermal energy of the core stream to be more efficiently utilized to produce a greater thrust from the combined exhaust than is obtainable by separately exhausting the core and bypass streams.

It has also been determined that the thrust delivered from the long duct mixed flow exhaust system of the present invention at cruise speed and altitudes is also significantly greater than that available from a short duct mixed flow engine. This increased thrust is the combined result of the more efficient propulsive force described above and the elimination of the scrubbing drag which accompanies the bypass duct fan exit flow, discharged at supersonic velocity, over the core engine nacelle surfaces downstream of the short bypass duct exhaust nozzle. Other aerodynamic factors also support the fact that the long duct mixed flow system has increased thrust capacity over separated flow systems due to reduced installed aerodynamic drag.

In order to reduce engine turbomachinery and exhaust noise, the convoluted lobed mixer is acoustically treated. Thus, the mixer may include various combinations of acoustically treated lobes, spool pieces, radial splitters, and/or circumferential splitters. Turbine noise is further reduced by acoustically treating the central core, or exhaust plug, of the mixer assembly, and the fixed area combined flow exhaust nozzle.

BRIEF DESCRIPTION OF THE DRAWINGS

The invention may be better understood upon reading the following description of the preferred embodiment in conjunction with the accompanying drawings in which.

DESCRIPTION OF THE PREFERRED EMBODIMENT

Figure 1:
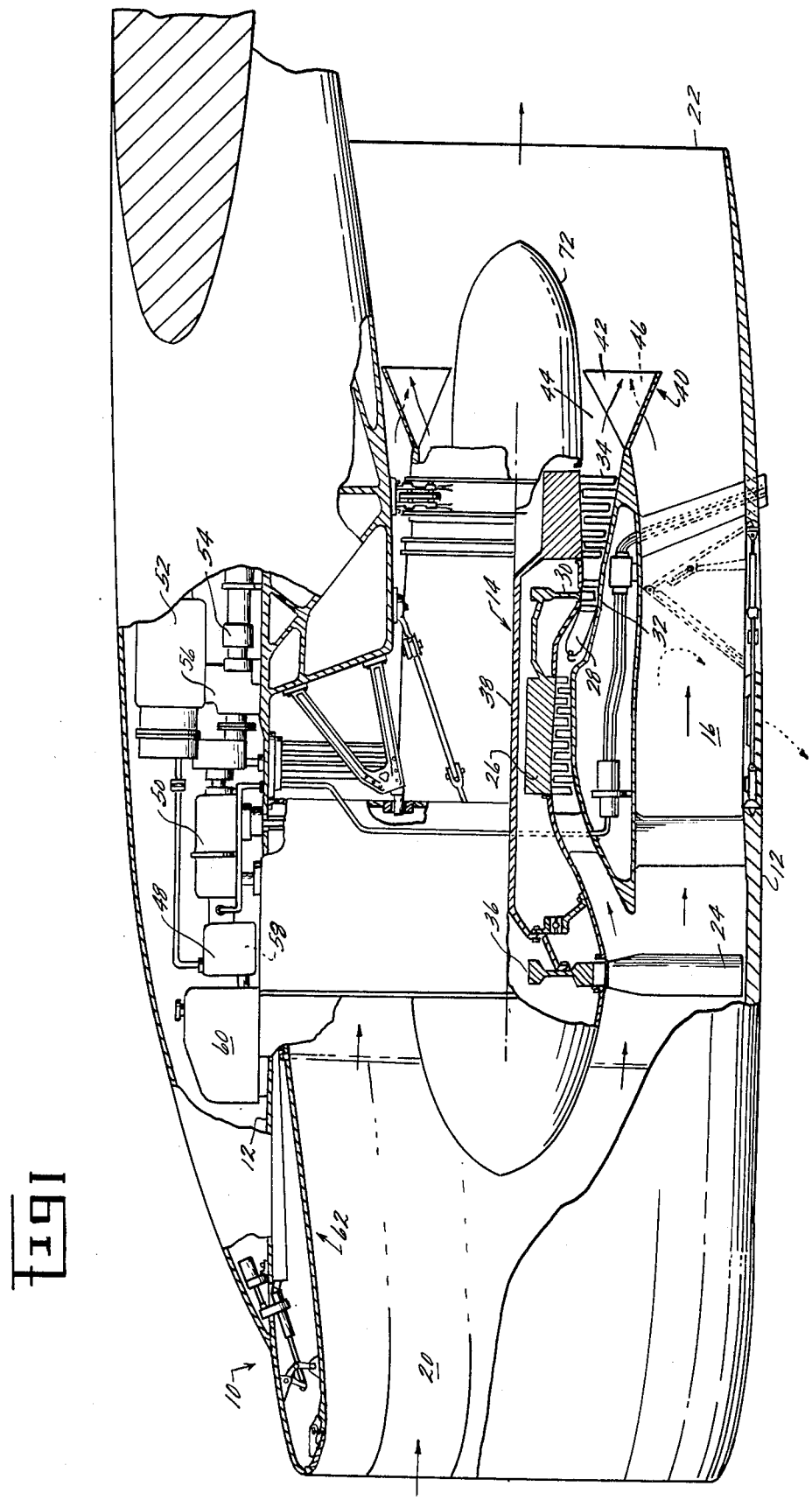
FIG. 1 is a cross-sectional view of a gas turbine engine incorporating the mixer of this invention.
Figure 2:
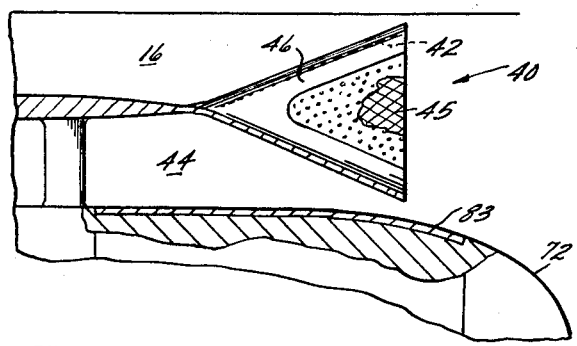
FIG. 2 is a cross-sectional view of an alternate embodiment for the mixer of this invention.
Figure 3:
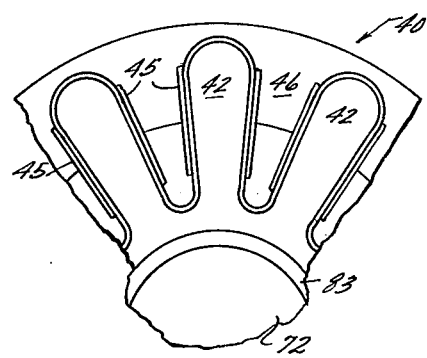
FIG. 3 is an end view of the mixer of FIG. 2.

Referring to FIGS. 1 through 3, there is shown a mixed flow gas turbine engine 10 having an outer casing or nacelle 12 spaced apart from an inner core engine shown generally at 14 so as to define an annular bypass duct 16 therebetween. The outer nacelle 12 extends upstream of the core engine 14 to define an inlet 20 to the engine 10 and downstream of the core engine 14 to define a fixed area exhaust nozzle 22 for the engine 10. Disposed in the engine inlet 20 is a fan 24 for pressurizing the total inlet airflow.

In operation, the fan 24 pressurizes the incoming air stream which is thereafter divided between the core engine 14 and the bypass duct 16. The airflow to the core engine 14 is further compressed by a core engine compressor 26 to provide a highly pressurized air stream for supporting combustion of fuel in a combustor 28. The hot gas stream generated by the combustor 28 is used to drive a high pressure turbine 30 which is connected to the rotor of the compressor 26. The hot gas stream discharged from the high pressure turbine 30 passes through an outwardly curved annular duct 32 to a low pressure turbine 34, which is connected to and drives the rotor 36 of the fan 24 through an upstream extending drive shaft 38. Disposed downstream and in flow communication with the low pressure turbine 34 and bypass duct 16 is convoluted lobed mixer 40 circumscribing an exhaust plug 72 and having a plurality of circumferentially spaced alternating hot chutes 42 in flow communication with the low pressure turbine discharge nozzle 44 and cold chutes 46 in flow communication with the bypass duct 16. The combined flows are thereafter discharged through the fixed area nozzle 22 formed integral with the outer nacelle 12. The mixer 40 is generally of the type described in U.S. Pat. No. 3,508,403, which is designed to reduce aerodynamic pressure losses as the fan and hot gas streams commingle.

In order to provide for ease in service and accessibility of engine accessories, provisions have been made for mounting the engine accessories exterior to the outer nacelle 12. Accordingly, most of the engine accessory components including the fuel pump 48, generator 50, starter 52, hydraulic pump 54, heat exchanger 56, ignition unit 58, and storage tank 60 are mounted exterior to the outer nacelle 12.

In order to minimize fan noise during takeoff and climbout, the inlet 10 upstream of the fan 24 is provided with a variable geometry mechanism shown generally at 62 for changing the cross-sectional flow area of the inlet 22 as more fully described in U.S. patent application, Ser. No. 646,326 filed concurrently herewith and assigned to the assignee of this invention.

A bypass stream thrust reverser shown generally at 94 is provided immediately aft of the engine fan frame.

Engine noise is further suppressed by constructing the entire nacelle 12 of a thin wall honeycombed structure which is acoustically absorbent. Engine noise is even further reduced by providing an acoustically absorbent lining 83 on the exhaust plug 72.

Figure 4:
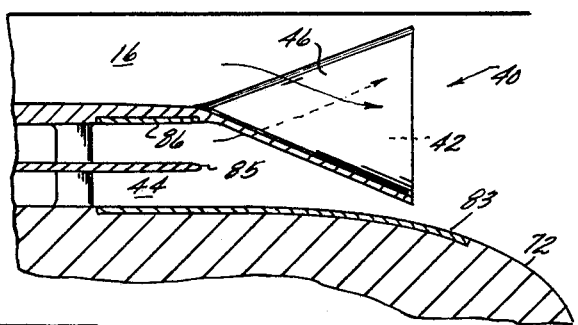
FIG. 4 is a cross-sectional view of an alternate embodiment for the mixer of this invention.
Figure 5:
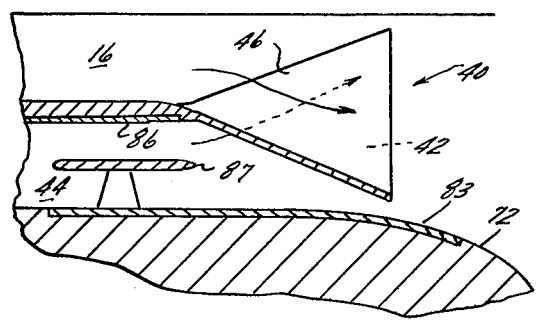
FIG. 5 is a cross-sectional view of an alternate embodiment for the mixer of this invention.
Figure 6:
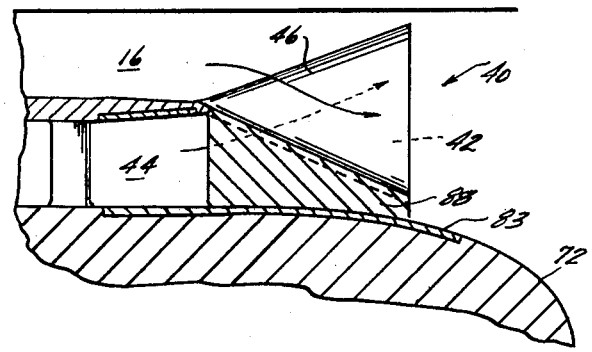
FIG. 6 is a cross-sectional view of an alternate embodiment for the mixer of this invention.
Figure 7:
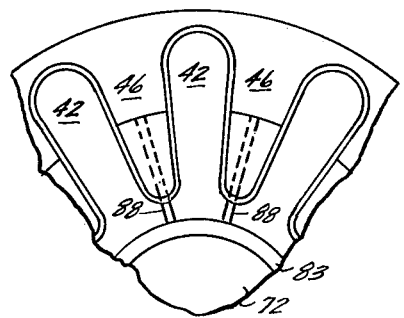
FIG. 7 is an end view of the mixer of FIG. 6.

Further aiding in the reduction of engine noise is the mixer design. Referring to FIGS. 2 through 7, therein are shown alternative embodiments for acoustically treating the mixer 40 in order to reduce core engine noise. In the embodiment of FIGS. 2 and 3, the mixer cold chutes 46 are lined with an appropriate acoustically absorbent material 45. Similarly, the hot chutes 42 may also be provided with an acoustically absorbent liner (not shown). In the embodiment of FIG. 4, an acoustically treated annular circumferential splitter 85 is placed immediately upstream of the hot chute 42 terminating upstream of the lobed mixer chutes 42 and, in addition, the interior walls upstream of the hot chutes 42 are provided with an acoustically absorbent liner 86. In the embodiment of FIG. 5, the circumferential splitter of FIG. 4 is replaced with an acoustically treated spool piece 87 which circumscribes the input to the mixer hot chutes 42. In the embodiment of FIGS. 6 and 7, a plurality of acoustically absorbent radial splitters 88 extending from the exhaust plug 72 through the inlet to the cold chutes 46 are provided.

While the acoustically treated mixer of this invention has been disclosed as incorporated into a gas turbofan engine of the long duct type, it will be apparent to those skilled in the art that the acoustically treated mixer of this invention has application to any mixed flow gas turbine engine incorporating a lobed mixer.

Having described preferred embodiments of the present invention, though not exhaustive of all equivalents, it will be appreciated by those skilled in the art that many modifications, substitutions and changes may be made thereto without departing from the fundamental theme of the invention. Therefore, what is desired to be secured by Letters Patent is as follows:

What is claimed is:

1. In a turbofan engine including an outer nacelle spaced apart from a core engine having a turbine to define an annular bypass duct therebetween, a noise reducing arrangement comprising in combination:
   a lobed mixer comprising a plurality of circumferentially-spaced, alternating, convoluted cold chutes in flow communication with the bypass duct and hot chutes in flow communication with the core engine said mixer adapted to mix air flowing in said bypass duct with hot gases flowing in said core engine; and
   acoustically-absorbent means positioned in the flow path within the core engine between said turbine and said hot chutes of said lobed mixer for reducing core engine noise, said acoustically-absorbent means terminating upstream of the lobed mixer.

2. The noise reducing arrangement of claim 1 wherein said acoustically-absorbent means comprises a circumferential splitter.

3. The noise reducing arrangement of claim 2 wherein said splitter terminates at the upstream end of said lobed mixer.

4. The noise reducing arrangement of claim 1 wherein said acoustically-absorbent means comprises a spool piece.

5. The noise reducing arrangement of claim 4 wherein said spool piece terminates at the upstream end of said lobed mixer.

6. In a gas turbofan engine which includes an outer nacelle spaced apart from a core engine to define an annular bypass duct therebetween, a noise reducing arrangement comprising:
   an exhaust plug:
   a lobed mixer circumscribing said exhaust plug and comprising a plurality of circumferentially-spaced, alternating, convoluted cold chutes in flow communication with the bypass duct and hot chutes in flow communication with the core engine; and
   acoustically-absorbent means disposed outside said hot chutes of said lober mixer and between said exhaust plug and said lobed mixer.

* * * * *